May 29, 1923.

C. W. H. BLOOD ET AL 1,456,864

SIDE HEAD CONSTRUCTION FOR MATCHERS AND THE LIKE

Filed July 7, 1920

Inventors:
Charles W. H. Blood,
Carl G. Osteman,
by Emery, Booth, Janney & Varney Attys.

May 29, 1923.

C. W. H. BLOOD ET AL 1,456,864

SIDE HEAD CONSTRUCTION FOR MATCHERS AND THE LIKE

Filed July 7, 1920

Inventor:
Charles W. H. Blood,
Carl G. Osteman.
by Emery, Booth, Janney & Varney Attys.

May 29, 1923.
C. W. H. BLOOD ET AL
1,456,864
SIDE HEAD CONSTRUCTION FOR MATCHERS AND THE LIKE
Filed July 7, 1920    3 Sheets-Sheet 3
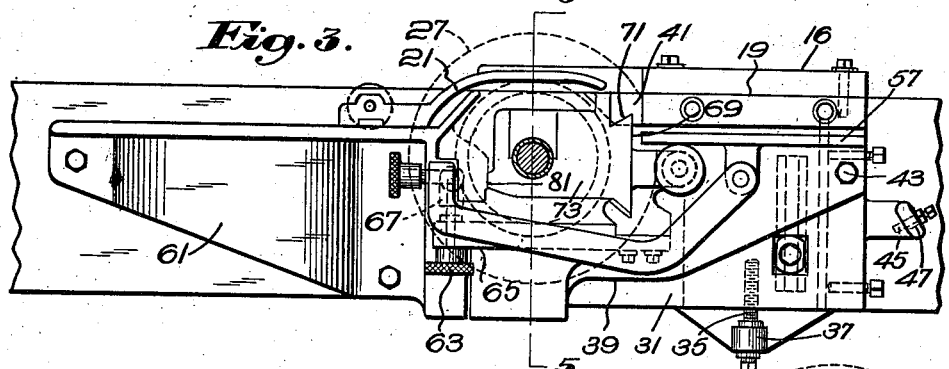
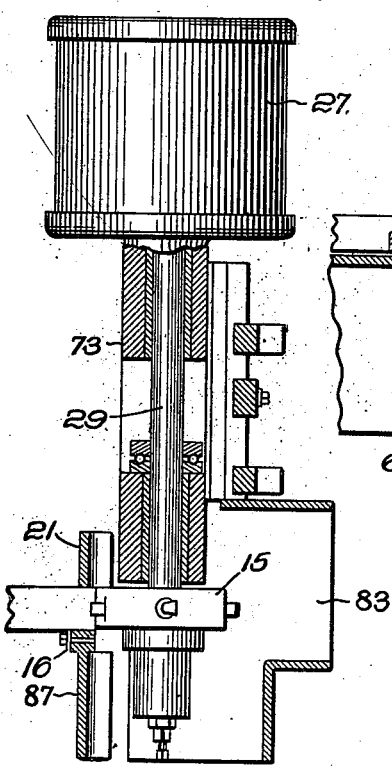
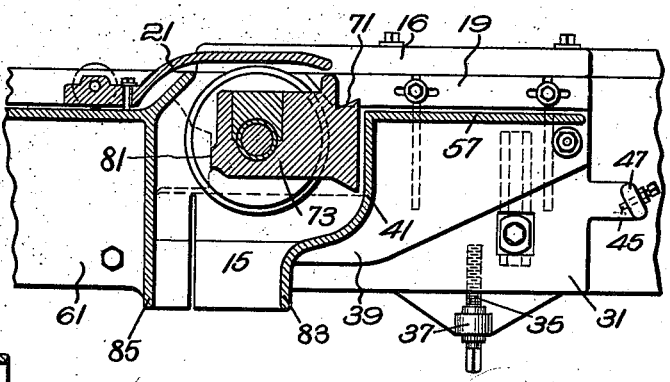
Inventors:
Charles W. H. Blood,
Carl G. Osteman,
by Emery, Booth, Janney & Varney
Attys Patented May 29, 1923.

1,456,864

UNITED STATES PATENT OFFICE.

CHARLES W. H. BLOOD, OF WINTHROP, AND CARL G. OSTEMAN, OF BOSTON, MASSACHUSETTS, ASSIGNORS TO S. A. WOODS MACHINE COMPANY, OF BOSTON, MASSACHUSETTS, A CORPORATION OF MASSACHUSETTS.

SIDE-HEAD CONSTRUCTION FOR MATCHERS AND THE LIKE.

Application filed July 7, 1920. Serial No. 394,450.

*To all whom it may concern:*

Be it known that we, CHARLES W. H. BLOOD and CARL G. OSTEMAN, citizens of the United States, and residents of Winthrop and Boston, respectively, in the county of Suffolk and State of Massachusetts, have invented an Improvement in Side-Head Constructions for Matchers and the like, of which the following description, in connection with the accompanying drawings, is a specification, like characters on the drawings representing like parts.

This invention relates to machines having rotary tools directly driven by rotary motors. In its more specific aspects it has to do with a construction applicable to the side heads of matchers or like wood working machines.

Our invention may best be understood by reference to the following description of the illustrative embodiment thereof shown in the accompanying drawings wherein we have shown by way of example as much of a matcher as is necessary to an understanding of our improvements as applied thereto and wherein:

Fig. 3 is a plan of the mechanism of one of the side heads, the motor casing being omitted;

Fig. 4 is a section on the line 4—4 of Fig. 1; and

Fig. 5 is an end elevation of one of the heads and adjacent mechanism partly in section along the line 5—5 of Fig. 3.

Figure 1:
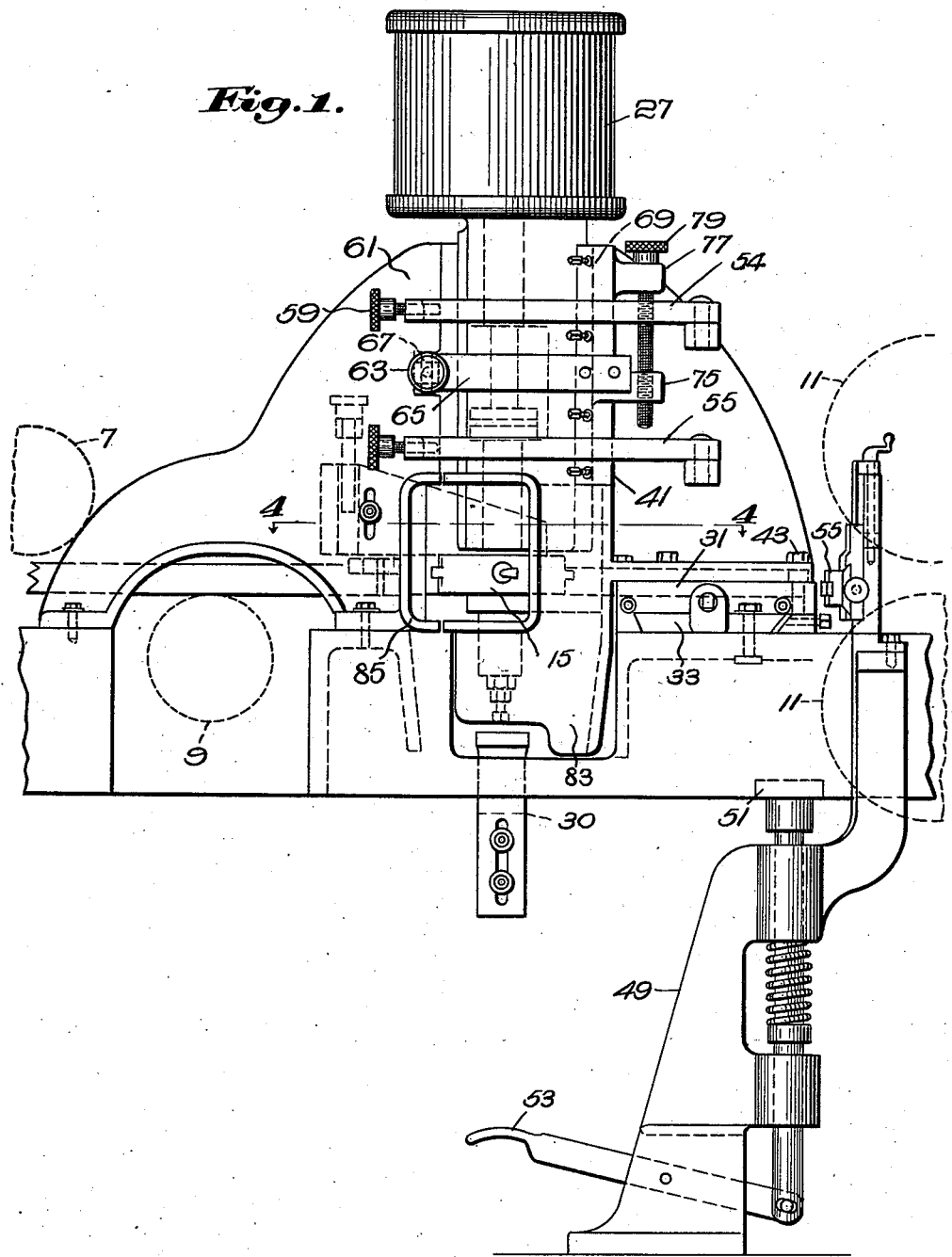
Fig. 1 is a partly diagrammatic side elevation of a portion of a matcher.
Figure 2:
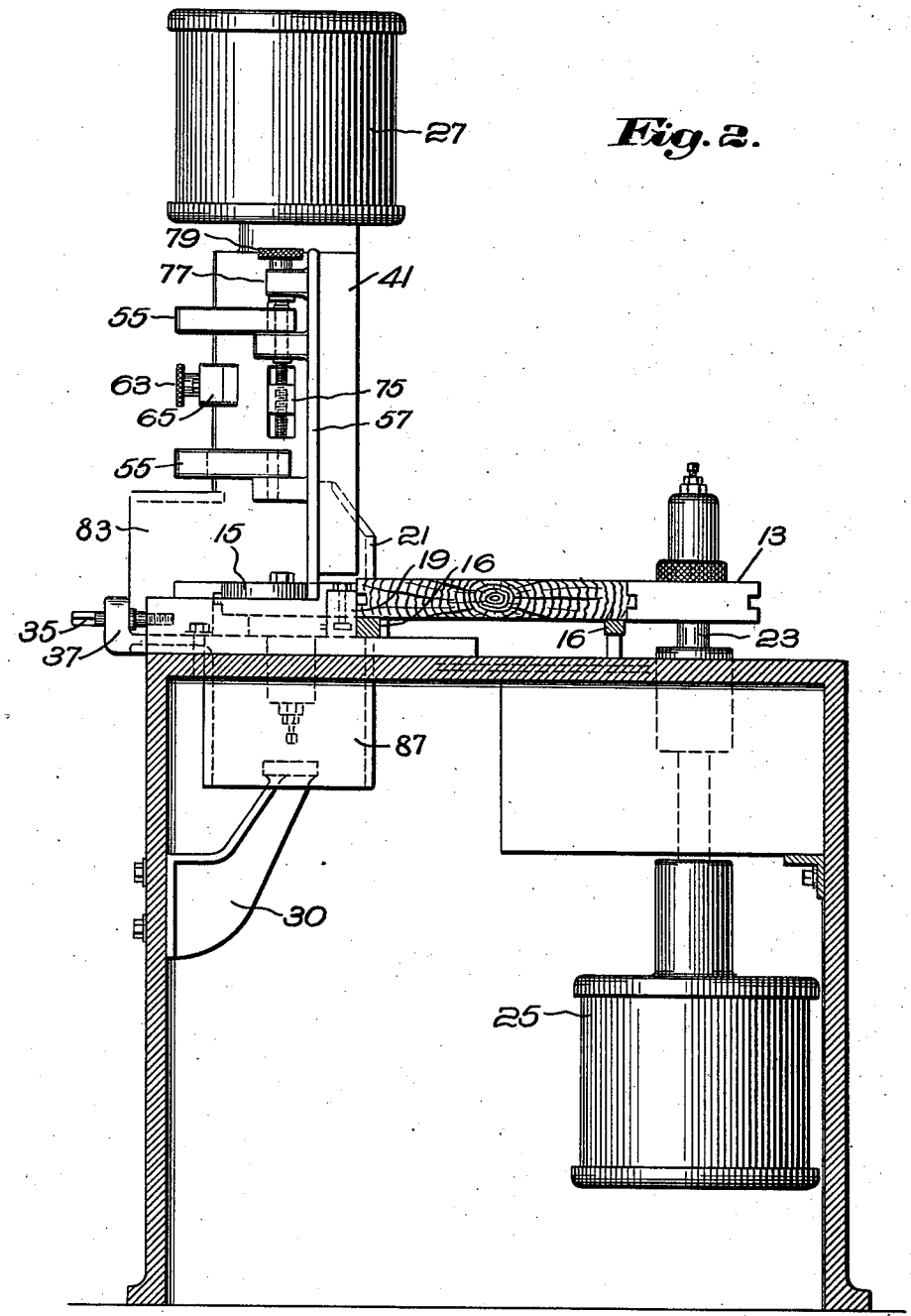
Fig. 2 is a transverse section adjacent the side heads.

In the accompanying drawings as an example of our invention we have shown a matcher wherein the side heads are directly driven by electric motors. In Fig. 1 we illustrate diagrammatically the upper and lower cutter heads 7 and 9 adapted to act on the upper and lower faces of a board passing through the machine. From the cutter heads 7 and 9 the board passes between the side heads to the feed rolls 11. As best shown in Fig. 2 the two side heads 13 and 15 rotate on vertical spindles in a plane just above the bed of the machine and act simultaneously on opposite edges of the board which passes over the supports 16 in contact with the guide 19 and under the holding down device 21.

Referring to Fig. 2, the head 13 is mounted on the upwardly projecting rotor 23 of an electric motor 25 mounted beneath the bed of the machine. Any ordinary or usual adjustments for positioning the head 13 may be provided but as these adjustments need not be essentially different in principle or form from the adjustments used with belt driven heads, we have not thought it necessary to attempt to show or describe them in detail.

In a matcher the two heads should be directly opposite each other transversely of the machine. The transverse dimensions of the machine are too restricted to permit a second motor to be placed side by side with the motor 25 while maintaining the alignment of the two heads. In accordance with our invention we provide for driving the cutter head 15 by an electric motor 27 which is placed above the bed of the machine with the rotor 29 thereof depending vertically to hold the cutter head in operative position above the bed of the machine and opposite the cutter head 13. A bracket 30 may be provided beneath the cutter head to prevent it from crashing to the floor in case of accident.

We herein mount the motor 27 in its inverted position by suitable means permitting desired adjustments of the cutter head and also providing for moving the cutter head in such a way as to give access thereto for changing the same or for jointing (grinding) it. The latter purpose is attained by pivotally mounting the motor for movement bodily to bring the cutter head away from the bed of the machine. In the present specific example this movement is about a substantially vertical axis.

Referring to the example shown in the drawings we may provide a base member 31 adjustable transversely of the machine on the dovetailed guideway 33, the adjustment being effected by a screw 35 swivelled in bracket 37 and entering the base plate 31. The base member 31 carries a member 39 from which rises a standard 41 to which the motor may be secured preferably by means hereinafter to be described. The member 39 is conveniently pivoted at 43 to the base plate 31 so that the entire member 39 may be swung about the substantially vertical axis to bring the standard 41 and the motor carried thereby out from the position shown in Fig. 3 so that the motor and the cutter head carried on the depending armature thereof will be moved outwardly from the bed of the machine and suspended adjacent the same in such manner that access can easily be had to the cutter head. A suitable stop such as that provided by the screw 45 threaded in bracket 47 of the base plate 31 provides for limiting the swinging movement of the member 39 and we have herein shown adjacent the side of the machine a stand 49 having a support 51 which will be aligned with the spindle of the cutter head when the member 39 is swung out against this stop and which may be raised by the pedal 53 into contact with the head to support the same. In the outward position of the motor the cutter head 15 may be readily removed and another substituted or the knives may be trued up or jointed. Herein we have shown an upright on the stand 49 supporting a suitable jointing mechanism 54 in contact with which the head 15 may be rotated by motor 27 when the parts are swung to their outward position.

For clamping the motor in its inward position, suitable latch arms 55 may be pivoted to the web 57 connecting the standard 41 to the member 39 and these arms carry at their opposite ends screws 59 provided with large heads in the nature of hand wheels which may be set up against the flange of the frame member 61 rising from the bed of the machine adjacent to the member 39 in the latter's closed position.

Provision is preferably made for swinging the motor and attached cutter head around the pivot 43 in comparatively slight amounts to vary the closed position thereof and thus obtain an adjustment of the cutter head toward and from the opposed cutter head. In the present instance this is effected by means of an adjusting screw 63 carried by a bar 65 secured to the standard 41 and adapted to tap into a block 67 pivoted to member 61. Turning of this screw moves the arms 67 and consequently the standard 41 which carries the motor about the pivot 43 and thus provides for adjustment of the cutter head in and out.

In the example of the invention here shown the cutter head also has a vertical adjustment and for this purpose (see Fig. 3) the standard 41 is provided with a dovetailed guideway 69 in which slides the dovetailed rib 71 on the motor carrier 73. The rib 71 is provided with a lug 75 projecting through a slot in the standard 41 and this standard is provided with an aligning lug 77 in which is mounted the adjusting screw 79 tapping into lug 75 and provided for adjustment of the motor carrier up and down in the standard 41.

Referring to Fig. 3 the member 61 may be provided with a suitable abutment surface 81 adapted to make contact with the motor carrier 73 in the closed position of the latter and provide a support for the same on the side opposite the rib 71 which suspends the same.

The member 39 has conveniently formed thereon or attached thereto the partial housing member 83 (see Figs. 4 and 5) which when the motor is swung inwardly to operative position mates with a partial housing 85 on the member 61 and provides in cooperation with the member 21 and the flange 87 depending from support 16 an angular chip hood or flue about the cutter head.

Having thus described in detail the illustrative embodiment of my invention shown by way of example in the accompanying drawings, what I claim as new and desire to secure by Letters Patent I shall express in the following claims:

1. A matcher or like machine comprising the usual horizontal bed, opposed rotary tools operating substantially in the plane of said bed and rotary motors directly coupled thereto and disposed respectively above and below the plane, the former having a pivotal mounting remote from the tool providing an inward position in which the tool is adapted to operate on work passing over the bed and adapted to be swung outwardly through a wide arc to an inoperative position wherein the tool is distant from the bed of the machine and of convenient access.

2. A matcher or like machine comprising the usual horizontal bed, opposed rotary tools operating substantially in the plane of said bed and rotary motors directly coupled thereto and disposed respectively above and below the plane, the former having a pivotal mounting on a substantially vertical axis remote from the tool providing an inward position in which the tool is adapted to operate on work passing over the bed and adapted to be swung outwardly through a wide arc to an inoperative position wherein the tool is distant from the bed of the machine and of convenient access.

3. A matcher or like machine comprising the usual horizontal bed, opposed rotary tools operating substantially in the plane of said bed and rotary motors directly coupled thereto and disposed respectively above and below the plane, and being mounted for movement toward and from one another, the construction permitting the motors to be brought closer than the sum of their radii, thereby adapting the machine for work on narrow boards.

4. A matcher or like machine comprising the usual horizontal bed, a standard carrier pivoted thereon to swing transversely of the bed, a motor carried by the standard and having a depending rotor to receive a side head and means for clamping the carrier in inward position with said side head in position to operate on work passing over said bed, the carrier when released by said clamping means being freely swingable to an outward position wherein the head is remote from the bed.

5. A matcher or like machine comprising the usual horizontal bed, a standard carrier pivoted thereon to swing transversely of the bed, a motor carried by the standard and having a depending rotor to receive a side head, means for clamping the carrier in inward position with said side head in position to operate on work passing over said bed, the carrier when released by said clamping means being freely swingable to an outward position wherein the head is remote from the bed, and means independent of said clamping means to provide for swinging movements of carrier about its pivot of small amplitude to provide adjustment of the inward position of the cutter head.

6. A matcher or like machine comprising the usual horizontal bed and a side leg which includes a motor having a depending rotor to support the side head adjacent the bed for operating on work passing thereover, said motor being pivoted on an axis remote from the head arranged to swing the head through a wide arc to an inoperative position remote from the bed providing for ready access thereto.

7. A matcher or like machine comprising the usual horizontal bed and a side leg which includes a motor having a depending rotor to support the side head adjacent the bed for operating on work passing thereover, said motor being pivoted on a substantially vertical pivot at one side of the axis of rotation thereof.

8. A matcher or like machine comprising the usual horizontal bed and a side leg which includes a motor having a depending rotor to support the side head adjacent the bed for operating on work passing thereover, said motor being pivoted on an axis remote from the head arranged to swing the head through a wide arc to an inoperative position remote from the bed providing for ready access thereto, releasable means for securing the leg in the inward operative position and independent means to provide for swinging movements of relative small amplitude providing adjustment of said inward position.

9. A side head construction for matchers and the like comprising a base adjustable transversely of the machine, a standard carrier pivoted to said base to swing transversely of the machine, a standard thereon, a motor carried by the standard and having a depending rotor to receive a side head and means for clamping the carrier in its inward position.

10. A side head construction for matchers and the like comprising a base adjustable transversely of the machine, a standard carrier pivoted to said base to swing transversely of the machine, a standard thereon, a motor carried by the standard and having a depending rotor to receive a side head and means for adjusting said carrier in its inner position by relatively slight swinging thereof about its pivot.

11. A side head construction for matchers and the like comprising a base adjustable transversely of the machine, a motor support pivoted thereon to swing about a substantially vertical axis, a motor on the support with depending rotor to receive the side head and means to clamp the support in inward position.

12. A side head construction for matchers and the like comprising a support to hold a motor with its rotor depending to receive a side head in operative position, said support having a pivotal mounting whereby the head may be moved away from the bed of the machine to give access thereto and complemental surfaces on said support and the machine frame mating when the support is in inward position to provide a chip hood about the head.

13. A side head construction for matchers and the like comprising a support to hold a motor with its rotor depending to receive a side head in operative position, said support having a pivotal mounting whereby the head may be moved away from the bed of the machine to give access thereto, stop means to limit the movement of the support and a jointer positioned to cooperate with the head in the outward position.

14. A matcher or like machine comprising a support to hold a motor with its rotor depending to receive a cutter head in operative position to act on work passing through the machine, a pivotal mounting for the support at one side of the motor permitting the head to be swung to an inoperative position away from the bed of the machine to provide access thereto, and a supporting surface on the opposite side of the motor into cooperation with which said parts close when moved from the latter position to the former.

15. A matcher or like machine comprising a vertical side head shaft adapted to receive a rotary cutter head, a support therefor pivoted on a substantially vertical axis on one side of the shaft, permitting it to be swung from an inward operative position wherein the cutter head is adapted to act on work passing through the machine to an outward inoperative position with said head remote from the bed of the machine and a supporting surface adapted laterally to engage said support on the side of the shaft opposite the pivot when the support is in the operative position.

In testimony whereof, we have signed our names to this specification.

CHARLES W. H. BLOOD.
CARL G. OSTEMAN.